United States Patent [19]

Froman

[11] Patent Number: 5,320,087

[45] Date of Patent: Jun. 14, 1994

[54] METHOD AND APPARATUS FOR PREVENTING SPLASHING CONDENSATE FROM ACTIVATING SAFETY PRESSURE SWITCH IN MULTI-POISE CONDENSING FURNACE

[75] Inventor: Donald R. Froman, Greenwood, Ind.

[73] Assignee: Carrier Corporation, Syracuse, N.Y.

[21] Appl. No.: 108,923

[22] Filed: Aug. 18, 1993

[51] Int. Cl.⁵ .............................................. F24H 3/02
[52] U.S. Cl. .................................. 126/110 R; 73/714; 126/116 R
[58] Field of Search .......................... 73/706, 714, 756; 126/110 R, 116 R

[56] References Cited

U.S. PATENT DOCUMENTS

| | | | |
|---|---|---|---|
| 3,542,018 | 11/1970 | Quick et al. | 126/116 R |
| 4,289,730 | 9/1981 | Tomlinson | 126/116 R |
| 4,467,780 | 8/1984 | Ripka | 126/110 R |
| 4,622,947 | 11/1986 | Hays et al. | 126/110 R |
| 4,653,466 | 3/1987 | DeHaan et al. | 126/110 R |

Primary Examiner—Richard E. Chilcot, Jr.
Assistant Examiner—William L. Oen

[57] ABSTRACT

A method and apparatus for preventing splashing condensate from activating the safety pressure switch in a multi-poise condensing furnace includes removing the existing tubing connected to upper and lower pressure taps provided on the collector box of the furnace. T connectors and secondary tubing are then fastened to each of the pressure taps and the existing tubing reconnected to a corresponding T connector.

8 Claims, 4 Drawing Sheets

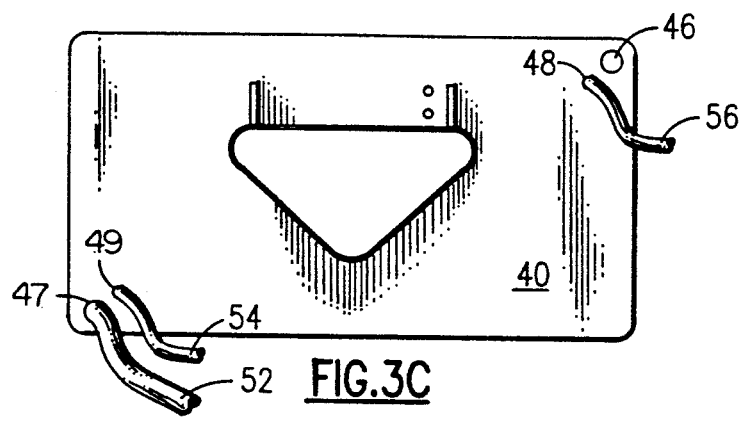
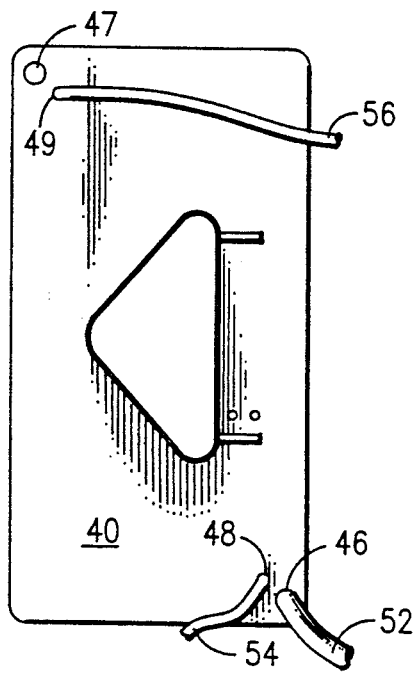
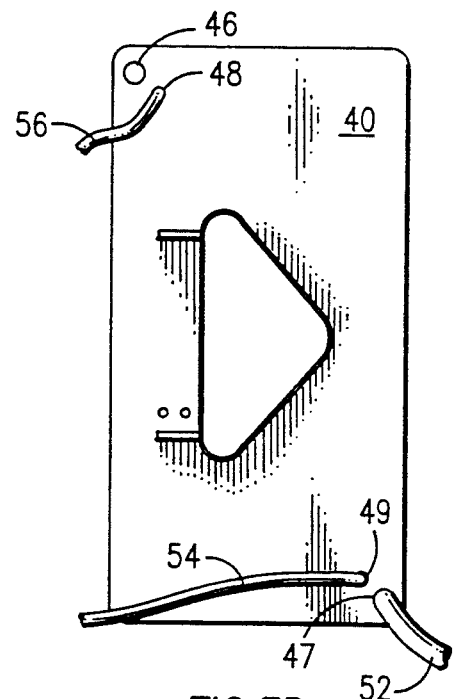
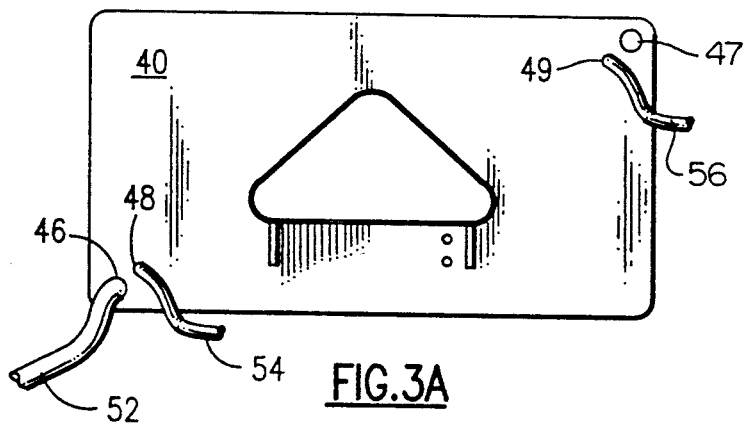

METHOD AND APPARATUS FOR PREVENTING SPLASHING CONDENSATE FROM ACTIVATING SAFETY PRESSURE SWITCH IN MULTI-POISE CONDENSING FURNACE

BACKGROUND OF THE INVENTION

1. Field of the Invention

This invention relates in general to multi-poise condensing furnaces and, in particular, to a method and apparatus for preventing splashing condensate in the collector box of a multi-poise condensing furnace from activating a safety pressure switch connected to the collector box.

2. Discussion of the Background Art

The residential heating industry has benefitted with the advent of multi-poise condensing gas furnaces. These furnaces typically include a primary heat exchanger positioned adjacent a secondary or condensing heat exchanger. A blower provides circulating air flow over the heat exchangers to produce heated air that may be directed and channeled to a desired location. The design of the multi-poise condensing furnace is optimized so that the furnace may be installed with any one of four different physical orientations while being capable of operating properly and equally efficiently in any orientation. These four possible orientations include directing the circulating heated air exiting the furnace in either an upflow, downflow, horizontal-left, or horizontal-right direction.

Both the primary heat exchanger and the condensing heat exchanger include cells with channels formed therein to direct the flow of flue gas produced by combustion. These cells are positioned side by side in a parallel manner and are provided with a predetermined spacing to allow the blower air to flow around the cells. The blower air is heated by convection as it moves over the cells.

Gas is provided to the furnace by a gas manifold. Manifold orifices direct the gas into burners contained in a burner box and the gas is ignited as it exits the burners. The heated flue gas produced by combustion is then directed into the primary heat exchanger cells and induced to move therethrough. The channels provided in the primary heat exchanger cells eventually terminate at discharge ports. The discharge ports of the primary heat exchanger are typically aligned and secured in a first sheet metal panel.

The condensing heat exchanger of the multi-poise furnace is configured in a similar manner. A series of side by side condensing cells is provided. Each of these condensing cells has an inlet port for receiving the flue gas discharged from the primary heat exchanger and a pair of discharge ports. One of the pair of discharge ports being positioned below the other along the vertical when the furnace is installed with either the upflow or downflow orientation. When the furnace is installed with either a horizontal-left or horizontal-right flow orientation, the two discharge ports of each condensing cell are positioned side by side along the horizontal.

Proper functioning of condensing furnaces requires that the water vapor existing in the combustion products carried in the flue gas is condensed only in the condensing heat exchanger cells and not elsewhere within the furnace. Each condensing heat exchanger cell is designed to allow proper drainage out of at least one of the discharge ports in any one of the four possible installation orientations. In the upflow or downflow installations, the lower of the two discharge ports will function to drain the condensate formed within each cell, while both discharge ports of a given pair will function to drain the condensate from a respective cell when the furnace is installed with either the right-horizontal or left-horizontal flow orientations.

The collector box is positioned on the discharge side of the condensing heat exchanger. As noted above, condensate formed in the condensing cells will drain into the collector box. The collector box is provided with two drain taps so that the collector box may be properly drained of condensate. The drain taps are positioned in diagonally opposed corners of the rectangular front face of the box. In any one of the four possible installation orientations, one of the two drain taps will be positioned in the lower portion of the collector. Upon installation, this lower drain tap is connected by tubing to suitable drain piping including a trap. As the condensate level increases during the operation of the furnace, it will eventually reach the level of the lower drain tap and be removed through the tubing and trap into the drain.

During operating of the multi-poise condensing furnace, pressure within the channels of the heat exchanger cells and the collector box is increased above ambient by operation of an inducer mounted on the front of the collector box that induces flow of flue gas through the cells. Pressure within the channels and the box is also contributed to by combustion occurring at the inlet side of the primary heat exchanger.

A pressure switch is provided in the multi-poise condensing furnace to provide an added level of safety in operation of the furnace. This safety pressure switch is connected by tubing to one of two pressure taps provided on the front side of the collector box. The location of each of these pressure taps is proximate to a corresponding drain tap positioned along an arc between the horizontal and vertical of the ninety degree angle forming each of the diagonally opposed corners of the collector box. This location of the pressure taps is optimum because it places a pressure tap just slightly above the corresponding lower drain tap in any one of the four possible installation configurations. This particular position of the pressure tap is necessary so as to allow the safety switch to be activated shortly after the drain first becomes blocked.

The condensate drain piping or drain could become blocked by any one of a number of possible causes. In this blocked condition, condensate would continue to build up in the collector box as well as in the condensing heat exchanger in the event the furnace were to continue to operate. To avoid this possibility, a safety pressure switch, as described above, is connected to the pressure tap proximate to the lower drain tap. Thus, when the condensate level in the box raises above the drain tap because of some blockage, the condensate will shortly thereafter also block the pressure tap connected to the safety switch. The safety switch will detect this pressure drop in the line and then prevent further operation of the furnace until the blockage is cleared and proper drainage resumes.

In the typical installation, the upper pressure tap is fluidly connected to the upstream side of the drain trap. The pressure in the collector box is thus used to assist in forcing a steady flow of condensate through the drain piping to aid in preventing blockage in the drain. In some installations, it has been observed that splashing of condensate within the collector box near the lower pressure tap connected to the safety pressure switch will repeatedly activate and deactivate the switch thus turning the furnace off and on even though the furnace is experiencing proper drainage from the box. This nuisance splashing may be caused by vibration of the operating furnace or any one of a number of possible causes.

OBJECTS AND SUMMARY OF THE INVENTION

It is, therefore, an object of the present invention to improve the operation of multi-poise condensing furnaces.

A further object of the present invention is to identify when splashing condensate in the collector box of a multi-poise condensing furnace results in activation of a safety pressure switch provided in the furnace.

Still another object of the present invention is to prevent splashing condensate in the collector box of a multi-poise condensing furnace from activating a safety pressure switch provided in the furnace.

These and other objects are attained in accordance with the present invention wherein there is provided a method and apparatus for preventing splashing condensate in the collector box of a multi-poise furnace from causing activation of a safety pressure switch. In accordance with one aspect of the present invention, after it has been determined that splashing condensate is causing nuisance activation of the safety switch, it is proposed to prevent this undesirable activation of the pressure switch by fluidly connecting the upper pressure tap to the lower pressure tap. As a consequence of this proposed intervention, splashing in the vicinity of the lower pressure tap will not undesirably activate the safety switch while a build-up of condensate caused by a drain blockage will still advantageously activate the safety switch thereby preventing further operation of the furnace until the blockage can be cleared and proper drainage resumed.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing, wherein:

FIGS. 3A, 3B, 3C and 3D are front elevational views of the collector box, each showing pressure tap and drain line connections for one of four installation orientations;

DETAILED DESCRIPTION OF A PREFERRED EMBODIMENT

Figure 1:
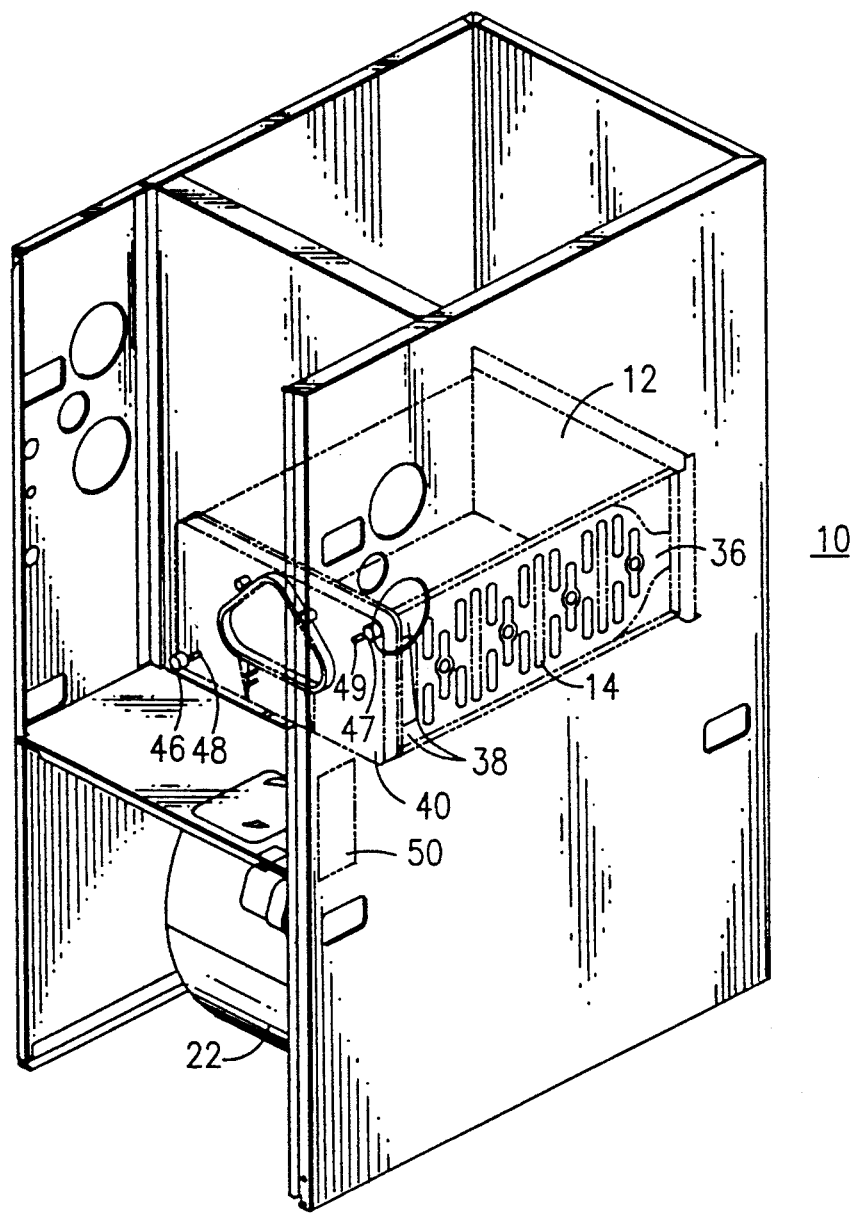
FIG. 1 is a perspective view of a multi-poise condensing furnace showing the typical collector box and taps.
Figure 2:
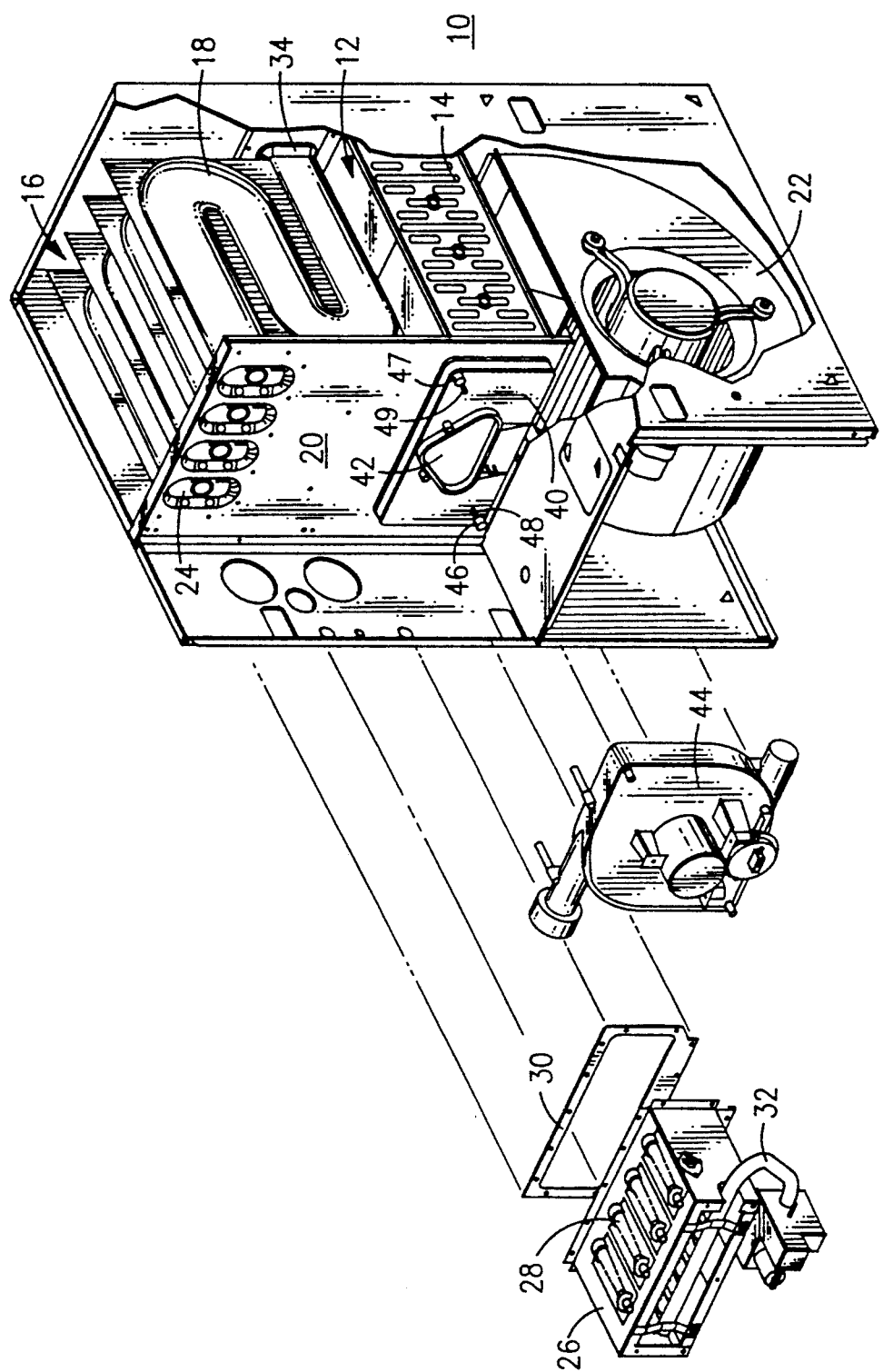
FIG. 2 is a partially exploded perspective view showing the principle components of the multi-poise condensing furnace of FIG. 1.

Referring now to the drawing and initially to FIGS. 1 and 2, there is shown a multi-poise condensing furnace generally referenced 10. The multi-poise condensing furnace 10 includes a condensing heat exchanger 12 and a primary heat exchanger 16. The condensing heat exchanger includes condensing heat exchanger cells 14 represented by one cell 14 as shown in FIG. 2 and in phantom in FIG. 1. The primary heat exchanger 16 includes primary heat exchanger cells 18 having a three pass channel configuration. The cells of the primary heat exchanger 16 and the condensing heat exchanger 12 are secured on one side by a cell panel 20. The furnace 10 is provided with a blower 22 which blows circulating air over the heat exchanger cells so that the air is heated by convection.

Referring again to the cell panel 20, there is provided a number of burner target plates 24. The area of the cell panel 20 including the burner target plates 24 receives a burner box 26 containing burners 28. The burner box 26 is secured to the cell panel 20 by means of sheet metal screws or other fasteners well known in the art. A burner box gasket 30 is provided between the burner box 26 and the cell panel 20 for providing a tight seal therebetween. The number of burners contained in the burner box in the present embodiment includes four which would correspond to the number of burner target plates 24 which in turn correspond to the number of primary heat exchanger cells 18. Depending upon the desired capacity of the furnace, the number of burners 28 may vary between 2 and 8. The number of burners 28 corresponds to the number of burner target plates 24 as well as the number of primary heat exchanger cells 18.

The burners 28 of the burner box 26 are supplied with gas by a gas manifold 32. Gas exiting from the burners 28 is ignited by an ignitor (not shown) thereby producing combustion and heated flue gas which is directed into the first pass of the primary heat exchanger cells 18. The flue gas then moves through the channels of the primary heat exchanger cells and exits at discharge ports 34 of the primary heat exchanger cells 18. The discharge ports 34 are in direct fluid communication with inlet ports 36 of each condensing heat exchanger cell 14. The flue gas then moves through the condensing heat exchanger cells 14 wherein water vapor carried by the products of combustion in the flue gas is condensed. The cooled flue gas then exits each condensing heat exchanger cell through a pair of discharge ports 38 and is directed into a collector box 40.

The collector box 40 is provided with an inducer opening 42 which receives an inducer 44 as shown in FIG. 2. The inducer 44 induces the flow of combustion products and flue gas through the cells of the primary and condensing heat exchangers. The inducer 44 is connected to venting pipe (not shown) to vent the flue gas and combustion products to an appropriate location exterior to the structure containing the furnace. The collector box 40 is also provided with a first drain tap 46 and a second drain tap 47. Positioned approximate to the first drain tap 46 is a first pressure tap 48 and positioned approximate to the drain tap 47 is a second pressure tap 49.

The multi-poise aspect of the furnace 10 derives from the flexibility of installation options provided for by the design of the furnace. The gas-fired condensing furnace 10 may be installed with any one of four possible installation orientations. The installation orientation represented in FIGS. 1 and 2 is the upflow configuration. This installation configuration would be appropriate for installing the furnace, for example, in the basement of the structure to be heated. The main heating supply duct would then be directed upward from the side of the furnace 10 containing the main discharge area of heated circulating air which in the installation in FIGS. 1 and 2 would be top side of the furnace. The optimized design of the gas-fired condensing furnace 10 allows the furnace to be installed in a downflow configuration, for example, in the event the furnace is required to be installed on the lower floor of a two story structure. In this downflow installation, the orientation of the furnace would be rotated 180 degrees from the orientation shown in FIGS. 1 and 2. With this installation the blower 22 would be at the top of the furnace while the main discharge side of the furnace including the primary heat exchanger cells 18 would be at the bottom of the furnace. In a similar manner, installation options are available for horizontal-left flow and horizontal-right flow installations.

The gas-fired condensing furnace 10 is provided with a control center 50 shown in schematic in FIG. 1. The control center 50 includes a microprocessor programmed to manage various operational aspects of the furnace 10 including switching on and off the blower, detecting when the gas is ignited, switching to air conditioning, controlling a humidifier terminal and managing status and diagnostic lights. The microprocessor is connected to circuitry having terminals which in turn are connected by hard wiring to the various electrical components of the furnace 10. Among these various electrical components is a pressure transducer of a known type capable of converting a pressure reading to electronic information. The pressure transducer in association with electronic circuitry and the microprocessor contained in the central center 50 act as a safety pressure switch which will be described in further detail hereinafter.

Referring now to FIGS. 3A, 3B, 3C and 3D, there is shown the collector box 40 in the four possible installation orientations. Specifically, FIG. 3A shows the orientation of the collector box 40 when the furnace is installed in the upflow installation, FIG. 3B shows the orientation of the collector box 40 when the furnace 10 is installed with a horizontal-left flow orientation, FIG. 3C shows the orientation of the collector box 40 when the furnace 10 is installed with the downflow orientation, and finally FIG. 3D shows the orientation of the collector box 40 when the furnace 10 is installed with the horizontal right flow orientation. Referring first to FIG. 3A, it can be seen that in the upflow orientation, the drain tap 46 becomes the lower drain tap. Pressure tap 48 thus correspondingly becomes the lower pressure tap while drain tap 47 becomes the upper drain tap and pressure tap 49 becomes the upper pressure tap. FIG. 3A also shows the lower drain tap 46 connected to a length of drain tubing 52. During operation of the furnace, condensate will form in the condensing heat exchanger cells 14 and drain through one or both of the discharge ports of the cells 14 into the collector box 40. In upflow and downflow installations as represented in FIGS. 3A and 3C, respectively, the condensate will drain from the condensing heat exchanger cells 14 through the bottom discharge ports 38. In the horizontal-left and horizontal-right flow installations as represented in FIGS. 3B and 3D, respectively, condensate will drain from the condensing heat exchanger cells 14 through both of the discharge ports 38 and into the collector box 40, since each of the discharge ports 38 will be aligned along the horizontal in these two installations.

During operation of the furnace in any one of the four installations, condensate will form in the condensing heat exchanger cells 14 and drain into the collector box 40. As the condensate builds up in the collector box 40, it will eventually reach the level of the lower drain tap and then be directed through the drain tubing 52 to an appropriate drain. The drain tubing will include a common trap. The lower drain tap will be drain tap 46 in the upflow and horizontal-left flow installations represented, respectively, in FIGS. 3A and 3B. When the furnace 10 is installed with a downflow or horizontal-right flow orientation, pressure tap 47 will become the lower drain tap and will thus be connected to the drain tubing 52. As shown in the FIGS. 3A, 3B, 3C and 3D, the upper drain tap, either 46 or 47 depending upon the installation orientation, is left sealed and unused.

Referring again to FIG. 3A it is shown that pressure tap 48 is connected to a length of tubing 54 that is connected to the pressure transducer associated with the control center 50. During operation of the furnace 10, the inducer 44 creates a pressure increase within both sets of heat exchanger cells as well as in the collector box 40. The increased pressure is required during normal operation in the furnace to induce the flow of combustion products and flue gas through the furnace. The pressure tap 48, shown in FIG. 3A, is connected to the pressure switch as a safety feature of the furnace 10. If the length of drain tubing 52 becomes blocked for any number of possible reasons, condensate will build up in the collector box 40 blocking the pressure tap 48 soon after the drain blockage occurs. In this situation, the pressure transducer will read a drop in pressure in the line 54 and relay this information electronically to the microprocessor contained in the control center 50. The control center 50 will then automatically shut off the furnace until a serviceman can be called to clear the drain piping from blockage and allow the furnace to resume normal operation. This safety feature is required in the gas-fired condensing furnace 10 so that condensate does not build up in the collector box 40 and condensing heat exchanger cells 14 which may result in loss of operating efficiency.

The lower pressure tap is pressure tap 48 in FIGS. 3A and 3B, respectively representing the upflow and horizontal-left flow installations, and pressure tap 49 in the horizontal right flow and downflow installations represented, respectively, in FIGS. 3C and 3D. The lower pressure tap is the one connected to the pressure safety switch because it is desired to shut off the furnace operation as soon as possible after a drain blockage is detected. The location of the pressure tap 48 in relation to the drain tap 46 as well as pressure tap 49 in relation to drain tap 47 is such that a lower pressure tap will be positioned just slightly above the corresponding drain tap in any one of the four possible installation orientations.

As shown in FIGS. 3A, 3B, 3C and 3D, the upper pressure tap 49, in the upflow and horizontal-left flow installations shown respectively, in FIGS. 3A and 3B and 48 in the downflow and horizontal-right flow installation orientations represented respectively in FIGS. 3C and 3D, are connected to a length of tubing 56 which is connected to the upstream side of the drain trap. This connection from the upper pressure tap to the drain trap aids drainage of condensate through the trap by allowing a pressure greater than ambient pressure to be transferred to a point on the upstream side of the drain trap thus inducing a steady flow of condensate through the drain. This helps in preventing blockage in the drain trap.

There has thus been shown and described two pair of pressure and drain taps, each pair of taps being positioned in diagonally opposed corners of the rectangular front face of the collector box 40 as a design feature to accommodate the multi-poise aspect of the furnace.

In some installation sites it has been observed that the gas-fired condensing furnace 10 will experience splashing condensate in the collector box 40 near the lower pressure tap. This splashing occurs due to vibration or any one of a number of other possible causes. The splashing condensate in the vicinity of the lower presure tab may cause a brief blockage in the pressure tap line 54 connected to the safety switch resulting in a brief pressure drop in the line 54 which in turn causes the safety pressure switch to be activated. This nuisance splashing can result in the undesirable effect of repeatedly activating and deactivating the safety pressure switch over a short period of time. This condition is undesirable and it is thus an object of the present invention to provide a method and apparatus for preventing splashing condensate from activating the safety pressure switch provided in the control center 50 of the multi-poise condensing furnace 10.

The control center 50 includes an electronic memory of the type well known in the art which is capable of recording the number of times the safety switch is activated during any given period of time. During normal functioning of the furnace, the period between switching on and off the furnace caused by calls for heating from a connected thermostat will be a relatively long period of time. The nuisance activation and deactivation of the safety switch caused by condensate splashing in the area of the lower pressure tap will result in a rapid turning on and off of the furnace. Thus, when it is observed that the furnace may be inappropriately cycling on and off, a service person can be called. If this observed on and off cycling is not occurring while the serviceman is on his call, the electronic memory provided in the control center 50 may be analyzed by the serviceman to determine that the furnace has experienced rapid on and off cycling. Once this high frequency of activation/deactivation of the safety switch is analyzed, it may be determined that the rapid cycling is caused by splashing condensate in the vicinity of the lower pressure tap rather than normal functioning of the furnace. After making that determination, a serviceman may then convert the multi-poise condensing furnace in accordance with the present invention.

Figure 5:
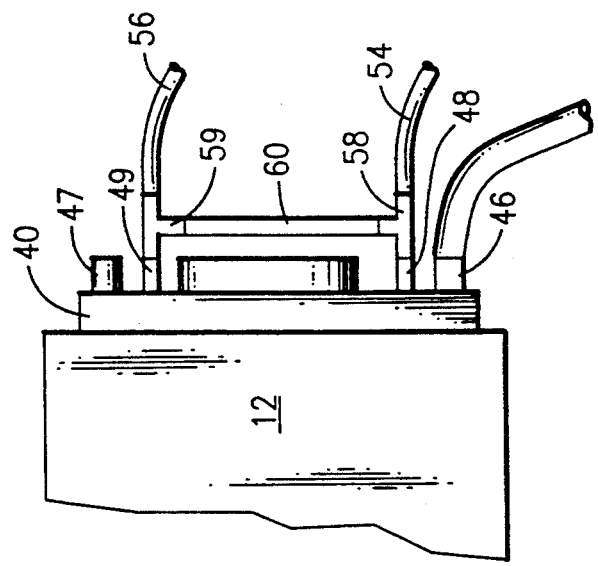
FIG. 5 is a side elevational view of the collector box of FIG. 4.
Figure 4:
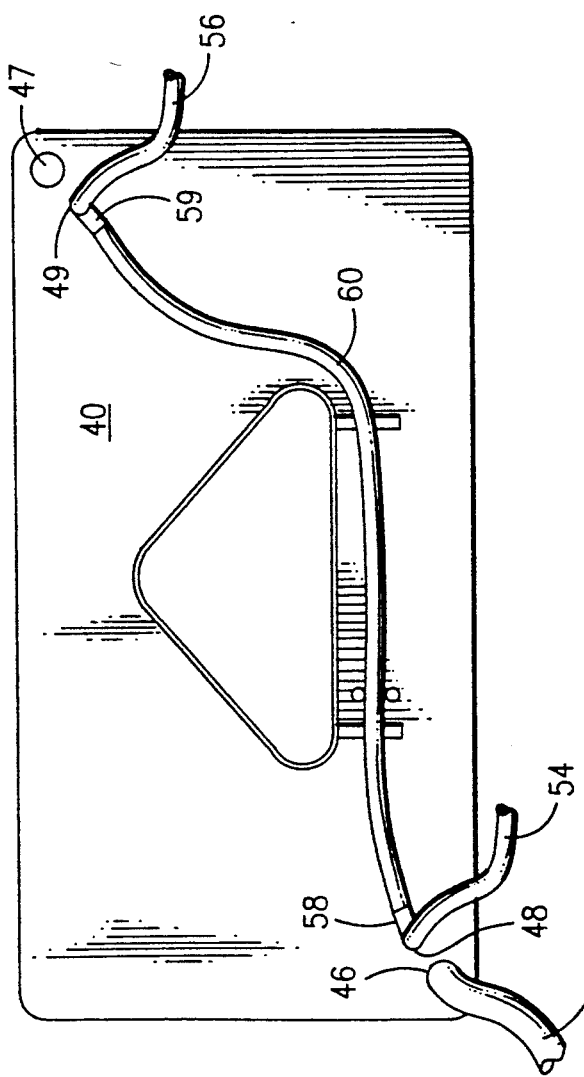
FIG. 4 is a front elevational view of the collector box of FIG. 3A employing the method and apparatus of the present invention.

In accordance with the apparatus of the present invention, FIGS. 4 and 5, representing the upflow installation orientation, show that the lower pressure tap 48 is provided with a first T connector 58 while the upper pressure tap 49 is provided with a second T connector 59. The length of tubing 54 connected to the pressure safety switch is reconnected to one of the open ends of the first T connector 58 while the length of tubing 56 connected to the upstream side of the drain tap is reconnected to one of the open ends of the second T connector 59. A third length of tubing 60 is connected between the remaining open ends of the T connectors 58 and 59. In this manner, the pressure transducer connected to the safety pressure switch will continuously read the pressure within the pressure box 40 even though splashing condensate may be occurring in the vicinity of the lower pressure tap 48. This results because the third length of tubing 60 is connected to the upper pressure tap 49 which is positioned well above the condensate level and any splashing occurring in the lower region of the box. The safety switch, however, will still properly be activated when the drain tubing 52 becomes blocked resulting in a build up of condensate in the lower portion of the collector box. This is so because as the condensate builds up in the collector box 40 in the vicinity of the lower pressure tap 48 shown in FIGS. 4 and 5, the condensate will eventually block both of the lengths of tubing 60 and 54. In this condition, the pressure transducer will read a pressure drop in the tubing line 54 and advantageously deactivate operation of the furnace until the blockage is cleared and proper drainage resumes.

While this invention has been described in detail with reference to a certain preferred embodiment, it should be appreciated that the present invention is not limited to that precise embodiment. Rather, in view of the present disclosure, many modifications and variations would present themselves to those of skill in the art without departing from the scope and spirit of this invention, as defined in the following claims.

What is claimed is:

1. A method for preventing splashing condensate from activating a safety pressure switch in a multi-poise condensing furnace having a collector box for collecting condensate formed by operation of the furnace, said collector box having first and second primary drain openings and first and second pressure taps, the first primary drain opening and pressure tap being positioned proximate to one another near a first corner of the collector box and the second primary drain opening and pressure tap similarly positioned proximate to one another near a second corner diagonally opposite to said first corner, the first pressure tap being fluidly connected to the safety pressure switch by a first length of tubing and the second pressure tap being fluidly connected to a drain trap by a second length of tubing, said method comprising the steps of:
   detecting splashing condensate in the vicinity of the first pressure tap causing blockage in the first length of tubing resulting in activation of the safety pressure switch; and
   connecting the second length of tubing at a point between the second pressure tap and the drain trap to the first length of tubing at a point between the first pressure tap and the safety pressure switch so that splashing condensate will not activate the safety pressure switch.

2. The method according to claim 1 wherein said detecting step includes the steps of:
   providing the multi-poise condensing furnace with an electronic memory device capable of recording the number of times the safety switch is activated during any given period of time;
   analyzing the recorded electronic memory to identify the frequency of successive activations of the safety pressure switch; and
   determining that the identified frequency of successive activations of the safety pressure switch is the result of splashing condensate in the vicinity of the first pressure tap rather than normal functioning of the furnace.

3. The method according to claim 1 wherein said connecting step includes the steps of:
   removing the first length of tubing from the first pressure tap;

connecting one of the open ends of a first T connector to the first pressure tap;

reconnecting the first length of tubing to another open end of the first T connector;

removing the second length of tubing from the second pressure tap;

connecting one of the open ends of a second T connector to the second pressure tap;

reconnecting the second length of tubing to another open end of the second T connector; and connecting the remaining open end of the first T connector to the remaining open end of the second T connector with a third length of tubing.

4. A method for preventing splashing condensate from activating a safety pressure switch in a multi-poise condensing furnace having a collector box for collecting condensate formed by operation of the furnace, said collector box having first and second primary drain openings and first and second pressure taps, the first primary drain opening and pressure tap being positioned proximate to one another near a first corner of the collector box and the second primary drain opening and pressure tap similarly positioned proximate to one another near a second corner diagonally opposite to said first corner, the first pressure tap being fluidly connected to the safety pressure switch by a first length of tubing and the second pressure tap being fluidly connected to a drain trap by a second length of tubing, said method comprising the steps of:

providing the multi-poise condensing furnace with an electronic memory device capable of recording the number of times the safety switch is activated during any given period of time;

analyzing the recorded electronic memory to identify the frequency of successive activations of the safety pressure switch;

determining that the identified frequency of successive activations of the safety pressure switch is the result of splashing condensate in the vicinity of the first pressure tap rather than normal functioning of the furnace; and connecting the second length of tubing at a point between the second pressure tap and the drain trap to the first length of tubing at a point between the first pressure tap and the safety pressure switch so that splashing condensate will not activate the safety switch.

5. The method according to claim 4 wherein said connecting step includes the steps of:

removing the first length of tubing from the first pressure tap;

connecting one of the open ends of a first T connector to the first pressure tap;

reconnecting the first length of tubing to another open end of the first T connector;

removing the second length of tubing from the second pressure tap;

connecting one of the open ends of a second T connector to the second pressure tap;

reconnecting the second length of tubing to another open end of the second T connector; and connecting the remaining open end of the first T connector to the remaining open end of the second T connector with a third length of tubing.

6. A method for preventing splashing condensate from activating a safety pressure switch in a multi-poise condensing furnace having a collector box for collecting condensate formed by operation of the furnace, said collector box having first and second primary drain openings and first and second pressure taps, the first primary drain opening and pressure tap being positioned proximate to one another near a first corner of the collector box and the second primary drain opening and pressure tap similarly positioned proximate to one another near a second corner diagonally opposite to said first corner, the first pressure tap being fluidly connected to the safety pressure switch by a first length of tubing and the second pressure tap being fluidly connected to a drain trap by a second length of tubing, said method comprising the steps of:

providing the multi-poise condensing furnace with an electronic memory device capable of recording the number of times the safety switch is activated during any given period of time;

analyzing the recorded electronic memory to identify the frequency of successive activations of the safety pressure switch;

determining that the identified frequency of successive activations of the safety pressure switch is the result of splashing condensate in the vicinity of the first pressure tap rather than normal functioning of the furnace;

removing the first length of tubing from the first pressure tap;

connecting one of the open ends of a first T connector to the first pressure tap;

reconnecting the first length of tubing to another open end of the first T connector;

removing the second length of tubing from the second pressure tap;

connecting one of the open ends of a second T connector to the second pressure tap;

reconnecting the second length of tubing to another open end of the second T connector; and connecting the remaining open end of the first T connector to the remaining open end of the second T connector with a third length of tubing whereby splashing condensate will not activate the safety pressure switch.

7. An apparatus for preventing splashing condensate from activating a safety pressure switch in a multi-poise condensing furnace, said apparatus comprising in combination:

a collector box for collecting condensate formed by operation of the furnace, said collector box having first and second primary drain openings and first and second pressure taps, the first primary drain opening and pressure tap being positioned proximate to one another near a first corner of the collector box and the second primary drain opening and pressure tap similarly positioned proximate to one another near a second corner diagonally opposite to said first corner, the first pressure tap being fluidly connected to the safety pressure switch by a first length of tubing and the second pressure tap being fluidly connected to a drain trap by a second length of tubing, means for providing an opening in said first length of tubing between the first pressure tap and the safety pressure switch, means for providing an opening in said second length of tubing between the second pressure tap and the drain trap and means for fluidly connecting said opening in the first length of tubing to said opening in the second length of tubing so that splashing condensate in the vicinity of the first pressure tap will not result in a pressure drop in the first length of tubing sufficient to activate the safety switch.

8. The apparatus according to claim 7 wherein said means for providing an opening in the first length of tubing includes a first T connector having three open ends, one of the open ends of said first T connector being connected to the first pressure tap and another open end thereof being connected to the first length of tubing, said means for providing an opening in the second length of tubing includes a second T connector having three open ends, one of the open ends of said second T connector being connected to the second pressure tap, and another open end thereof being connected to the second length of tubing, and said means for fluidly connecting the first and second lengths of tubing includes a third length of tubing connected between the third open ends, respectively, of said first and second T connectors.

* * * * *